United States Patent [19]

Sklair

[11] 4,312,567
[45] Jan. 26, 1982

[54] REFLECTOR AND CADENCE COUNTER FOR JOGGERS

[76] Inventor: Leonard Sklair, 141 Madison Ave., Perth Amboy, N.J. 08861

[21] Appl. No.: 175,599

[22] Filed: Aug. 5, 1980

[51] Int. Cl.³ .............................................. G02B 5/12
[52] U.S. Cl. ...................................... 350/98; 350/99
[58] Field of Search .................................. 350/97–105, 350/109; D10/11; 224/218; 40/586; 119/106

[56] References Cited

U.S. PATENT DOCUMENTS

| | | | |
|---|---|---|---|
| 2,361,287 | 10/1944 | Gustin | 350/98 |
| 3,887,268 | 6/1975 | Golden et al. | 350/103 |

FOREIGN PATENT DOCUMENTS

| | | | |
|---|---|---|---|
| 872759 | 4/1956 | Fed. Rep. of Germany | 50/98 |
| 452098 | 8/1936 | United Kingdom | 350/98 |

*Primary Examiner*—R. A. Rosenberger
*Attorney, Agent, or Firm*—Hedman, Casella, Gibson & Costigan

[57] ABSTRACT

A safety reflector for a jogger is disclosed with a cavity behind the reflector surface in which a hard disk, such as a coin, is placed so that as the jogger runs the disk, as it bounces, causes a flickering pattern on the reflector and sounds cadence in accordance with the gait of the jogger.

11 Claims, 4 Drawing Figures

REFLECTOR AND CADENCE COUNTER FOR JOGGERS

FIELD OF THE INVENTION

This invention relates to a device for attachment to individuals traveling in darkness to identify the presence of the individual in the darkness. More particularly, the invention is particularly suited for joggers who are out jogging on public thoroughfares wherein automobiles or other vehicles travel.

BACKGROUND OF THE INVENTION

In recent years, the public has become interested in physical health activities. One of the physical health activities that has become particularly popular is jogging. Adults and children have both become interested in jogging for physical fitness and health.

Many joggers do their jogging in the early morning or late evening because of either the more preferable weather conditions or the daytime business or school conflicts. Thus, much jogging occurs in the darkness.

The combination of jogging in darkness and on public thoroughfares creates a dangerous condition. As a result, several designs have been developed to make the jogger visible to the drivers of automobiles and other vehicles traveling on thoroughfares used by joggers. Reflective tape has been provided for the garments of the jogger. The tape will identify the runner but has the disadvantage of becoming worn as the fabric is laundered. In addition, the reflection given is simply that of a stark strand of reflected tape.

Similarly, reflective vests have been provided for the runner. The reflective vests also suffer somewhat from the same laundering problem as the reflective tapes and the further fact that chaffing occurs.

Many runners desire to establish a rhythmic or steady pace as they run. Counting cadence orally or with the aid of bells or other devices attached to the runner's shoes have been tried.

SUMMARY OF THE INVENTION

The present invention is comprised of a reflector member formed with prisms to reflect light. The reflective surface is covered with a crystal or protective shield of transparent material.

In addition a clip is integrally formed with the reflector at the back surface to detachably attach the reflector to various portions of the jogger's attire. The clip is arranged to attach the reflector to a belt, running shorts, shirts of even the socks of a runner.

In addition, the reflector is provided with an opaque disc-like object to fit between the reflective surface and the inner surface of the transparent protective shield. The disc-like member can conveniently be a copper penny or a silver dime. When the runner runs, the disc (penny or dime) bounces within the reflector and provides a sound by bouncing on the inner surface of the protective shield. The sound of the bouncing disc is in cadence with the runner's gait. In one embodiment, the reflector is provided with a slot at the top of the protective shield for insertion of the penny or dime thereby making the cadence counter optional.

The bouncing opaque disc also provides a more pronounced illumination pattern since it moves across the illuminated reflecting areas in a path thereby masking the prisms immediately behind the disc on the reflecting surface to make the runner even more noticeable.

A key holder is also provided on the clip.

DESCRIPTION OF THE PREFERRED EMBODIMENT

Figure 1:
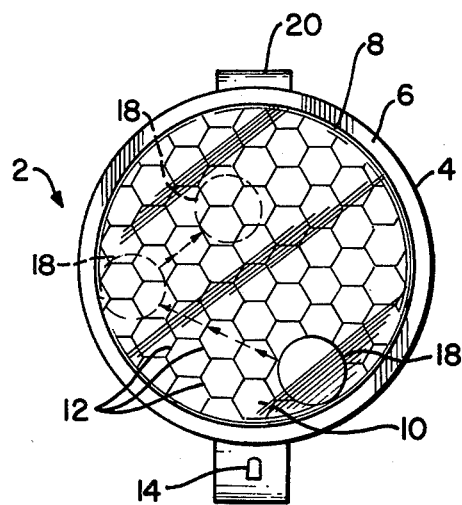
FIG. 1 is a front elevational view of the reflector-cadence counter invention.
Figure 2:
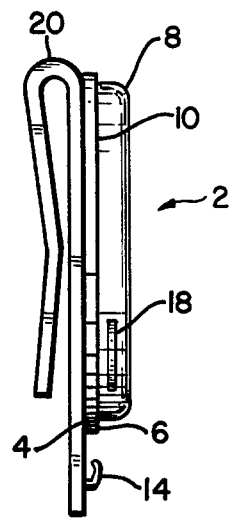
FIG. 2 is a side elevational view of the reflector shown in FIG. 1.

The composite assembly of the applicants reflector-cadence counter 2 is shown in FIGS. 1 and 2. The reflector and cadence counter 2 consists essentially of a housing 4, a reflector surface 10 and a clip 20.

The housing 4 is circular in the preferred embodiment and includes a bezel 6 integrally formed therewith. The bezel 6 is formed on the periphery of the housing and extends forwardly therefrom to attach a crystal or transparent protective cover shield 8. The bezel 6 attaches the transparent protective shield 8 to the housing 4 in essentially sealed relationship.

The reflector surface 10 is secured to the surface of the housing 4 in conventional manner and is comprised of a plurality of reflective prisms 12 which occupy the entire reflector surface 10. The bezel 6 retains the crystal or protective cover shield 8 spaced apart from the reflector surface 10 a distance slightly greater than the width of a copper penny. The reflector surface 10 can conveniently be a standard DOT (Department of Transportation) auto or bicycle reflector.

The clip 20 is firmly secured to or integrally formed with the back of the housing 4. The clip 20 is made of either resilient plastic, spring steel or any other material which will detachably attach to a runner's belt or garment.

The reflector cadence-counter 2 also includes a keyholder hook 14 sized to allow the conventional hole found in keys to snap on the hook 14. The key holder hook 14 is provided because runners who run at odd hours often must carry a key to enable them to reenter their home after running.

Figure 3:
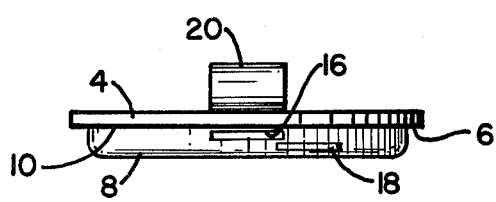
FIG. 3 is a top plan view of the alternative embodiment of the reflector-cadence counter wherein a slot is provided to make the cadence counter optional.

As best seen in FIG. 3, a slot 16 is provided in the top of the protective cover shield 8 adjacent the bezel 6 for insertion of a hard resilient disc-like object 18. The disc-like object 18 is used to cooperate with the reflector to provide a cadence counter. A copper penny or dime, respectively now one cent and ten cents in United States of America currency, have been found in practice to be very suitable for use as the cadence counter disc 18.

The penny, dime or other opaque disc 18 acts as a cadence counter since the hard metal of the disc 18 is capable of bouncing on the inner surface of the crystal or transparent protective cover shield 8 in cadence with the runner's gait. In addition, the path taken by the disc 18 to provide cadence counting obscures the portion of the surface of the reflector 10 over which it is passing. Thus, a flickering type of reflection is given to thereby more prominently reveal the jogger to the operator of a vehicle.

The design of the reflector-cadence counter requires that the crystal or protective cover shield 8 be spaced apart from the surface of the reflector 10 a distance sufficient to allow the disc 18 to bounce without becoming stuck or obstructed. Practice has shown that by spacing the protective cover shield 8 from the surface of the reflector 10 a distance slightly greater than the width of a penny, both a penny and dime can be used as the cadence disc 18. It is also necessary that the surface of the reflector 10 and the inner surface of the protective cover shield 8 be sufficiently adhesive to avoid impairing travel of the disc 18. Conventional plastics such as transparent poly(Dmethyl-Methacrylate) or polystyrene have been found to be suitable. Further, the sealed or essentially sealed relationship required between the transparent protective shield 8 and the housing 4 or reflector 10 is only such as to avoid any openings which would allow the disc 18 to fall from the area between the reflector 10 and the transparent protective shield 8.

Figure 4:
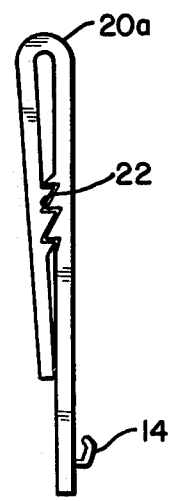
FIG. 4 is an alternative embodiment of the clip of the reflector.

In an alternative embodiment, seen in FIG. 4, the clip 20a is provided with mating serrations 22 to more securely attach the reflector cadence counter 2 to the garment of the wearer whether it be shirt, running shorts, belt or socks.

I claim:

1. A reflective device comprised of a reflector surface; a clip to attach the reflective surface to a garment; and means for providing both a flickering pattern to the reflector and for sounding cadence in accordance with the gait of a jogger.

2. A reflective device as in claim 1 wherein the means for providing a flickering pattern to the reflector and the means to sound cadence is comprised of a transparent protective shield covering the reflector surface and a slot in the upper surface of the transparent protective shield sized to allow insertion of a hard resilient disc; wherein the distance by which the reflector surface and transparent protective shield are spaced apart is a distance slightly greater than the width of the disc.

3. A reflector-cadence counter comprised of:
a circular reflector surface;
a transparent protective shield attached essentially in sealed relationship at the periphery of the reflector and covering the reflector surface, the shield having an inner surface displaced from the reflector surface;
a hard resilient disc located between the reflector and the inner surface of the shield;
wherein the distance between the reflector surface and the inner surface of the shield is slightly greater than the width of the disc; and
whereby interrupted movement of the reflector cadence-counter causes the disc to bounce in the space between the reflector and the transparent surface.

4. A reflector-cadence counter as in claim 3 further comprising means to attach the reflector-cadence counter to a garment.

5. A reflector-cadence counter as in claim 3 further comprising a slot at the top of the protective shield which slot is sized larger than the diameter of the disc.

6. A reflector-cadence counter as in claims 3, 4 or 5 further comprising means for attaching a key to the reflector.

7. A reflector-cadence counter as in claims 3, 4 or 5 wherein the inner surface of the transparent protective shield is abhesive.

8. A reflector-cadence counter as in claim 7 wherein the disc is either a penny or dime.

9. A reflector-cadence counter as in claim 4 wherein the means to attach the reflector-cadence counter to the garment of a runner is a clip having mating members which are urged into contact by the inherent nature of the material forming the clip.

10. A reflector-cadence counter as in claim 9 further comprising serrations on the mating members of the clip which are in contact.

11. A reflective device comprised of:
a reflector surface;
a clip to attach the reflector surface of a garment;
a transparent protective shield attached in essentially sealed relationship at the periphery of the reflector, said protective shield spaced apart from the reflector surface;
an opaque disc located in the area between the reflector surface and the transparent protective shield, which opaque disc is narrower than the space between the reflector surface and the transparent reflector shield; and
whereby interrupted movement of the reflector will cause the opaque disc to move over the surface of the reflector.

* * * * *